United States Patent [19]

Nossen

[11] Patent Number: 5,392,450

[45] Date of Patent: Feb. 21, 1995

[54] SATELLITE COMMUNICATIONS SYSTEM

[75] Inventor: Edward J. Nossen, Cherry Hill, N.J.

[73] Assignee: General Electric Company, Philadelphia, Pa.

[21] Appl. No.: 818,268

[22] Filed: Jan. 8, 1992

[51] Int. Cl.[6] .......................................... H04B 7/185
[52] U.S. Cl. ................... 455/12.1; 455/13.2; 455/13.4; 455/17; 370/104.1; 342/352
[58] Field of Search .............. 342/352; 455/12.1, 13.2, 455/17, 13.4; 370/95.1, 95.3, 97, 104.1

[56] References Cited

FOREIGN PATENT DOCUMENTS 3824338  1/1990  Germany .

OTHER PUBLICATIONS

NORSAT Signalling Methods by Bjon Sandnes 1977.
COMSAT Technical Review, vol. 18, No. 1, 1988, Washington, D.C. pp. 21–53.
IEEE Globecom 1989, vol. 2, No. 21, Nov. 1989, Dallas, Tex. pp. 738–749.
IEEE Communication Magazine, vol. 26, No. 5, May 1988, New York, N.Y. pp. 34–44.
"A Man-Portable X-Band Terminal System" H. Goldberg, W. F. Sullivan, D. H. L. Yin–1989 IEEE.

*Primary Examiner*—Reinhard J. Eisenzopf
*Assistant Examiner*—Andrew Faile
*Attorney, Agent, or Firm*—Geoffrey H. Krauss

[57] ABSTRACT

A multiple channel demand assignment multiple access (DAMA) system is configured as a spoke-and-hub star network in which a satellite relays information between each of many small-aperture terminals (SATs), which may be portable terminals (PTs), and a hub network control terminal (NCT) which receives requests from the PTs, allocates channel resources, and broadcasts housekeeping messages. The system has a reservation protocol using at least three separate data channels to take advantage of the inherent lack of adequate radiated power at the PTs: a NCT outbound channel is tightly packed with data, without guard spaces, and it uses typically 98% of the allocated power; separate return channels for data and reservations use little satellite power, with no need for extremely tight data packing. Guard spaces are included in the reservation channel to overcome the total range of propagation delay uncertainty without requiring knowledge of the location of a particular PT.

20 Claims, 5 Drawing Sheets

SATELLITE COMMUNICATIONS SYSTEM

The present invention relates to satellite communication systems and, more particularly, to a novel system for providing communications between portable stations with small antennae, via a satellite hub of a star network having a network control terminal and operating with a three-channel protocol.

BACKGROUND OF THE INVENTION

Figure 1:
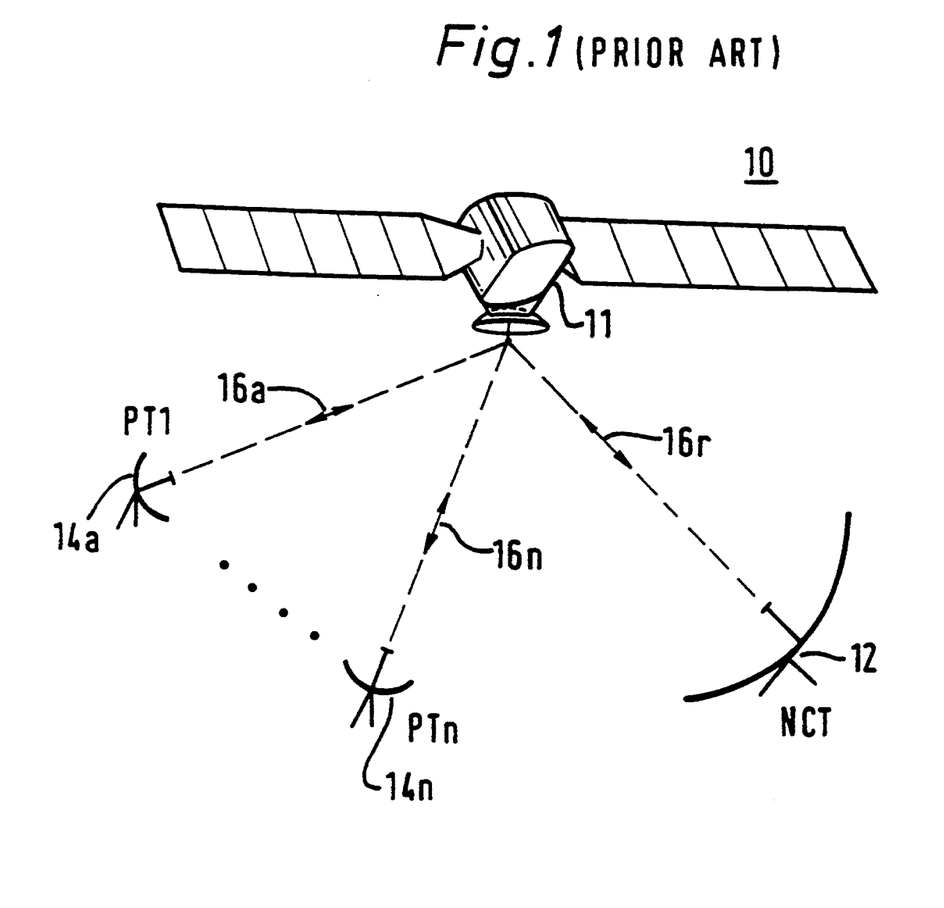
FIG. 1 is a view of a typical communications system using a satellite to effect information transmission between ones of a plurality of portable terminals and a network control terminal.
Figure 2:
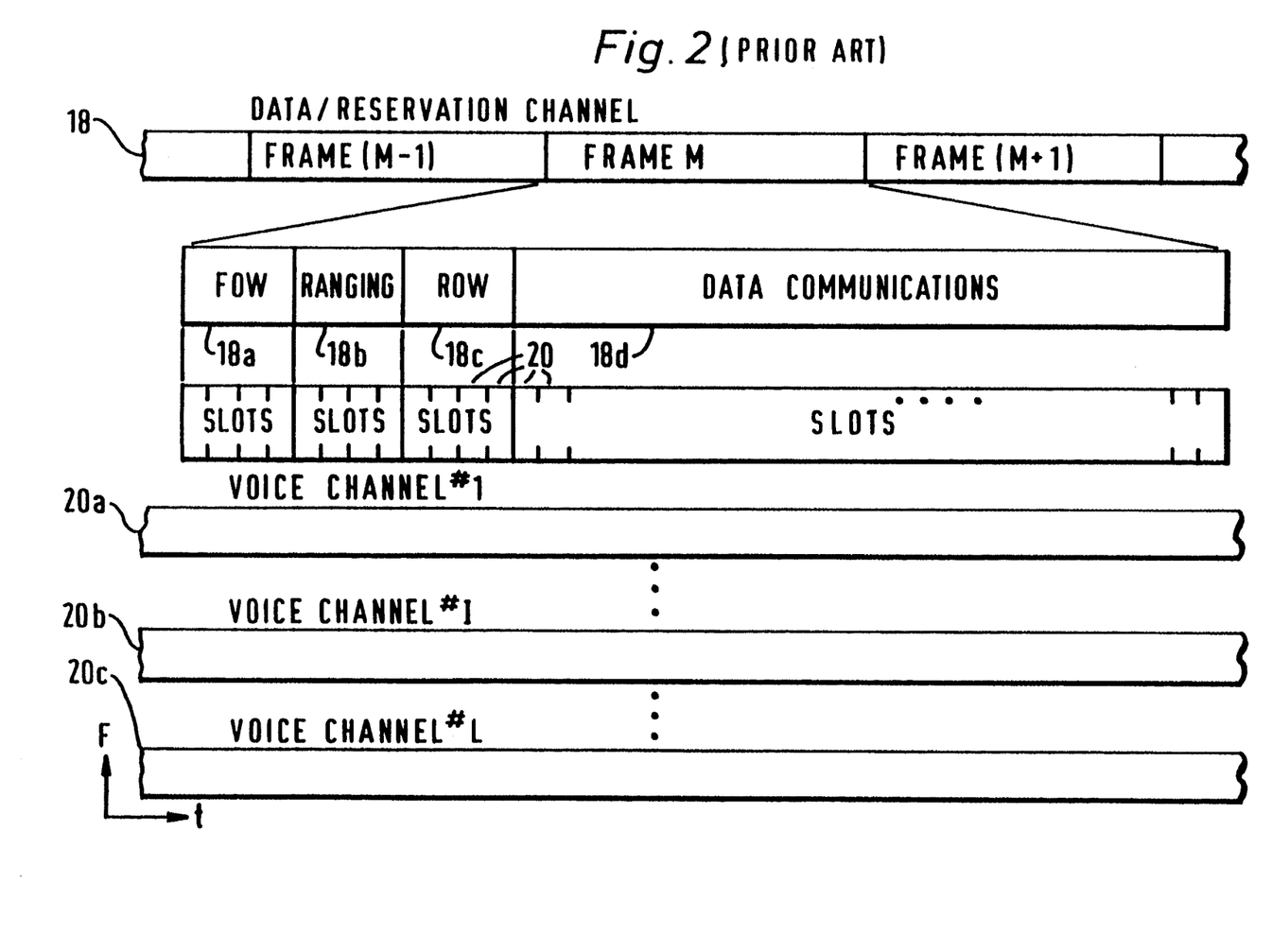
FIG. 2 is a frequency-time graph of a prior-art single data/reservation channel protocol.

It is now known to provide satellite-assisted communications between small portable terminals (PT) communicating through a large hub terminal in a star network configuration centered on a network with at least one satellite. One form of this network concept is the Very Small Aperture Terminal (VSAT) network used in commercial systems. Since communications at useable data rates cannot be established directly between two small terminals due to their limited antenna gain-to-temperature ratio (G/T) and effective isotropic radiated power (EIRP), a large hub terminal is required. One such system, as described by H. Goldberg et al. in "A Man-Portable X-Band Terminal System", IEEE MilCom 1989, pp. 457–462, and is shown in FIG. 1; the system 10 has a central satellite 11 and a hub terminal 12 (with an assumed antenna diameter of at least 20') which not only acts as a relay for communications between portable terminals (PTS) 14 (such as the plurality N of PTs, including a first terminal 14a, denominated PT1, up to an n-th terminal 14n, denominated PTn), but also serves as the network control terminal (NCT) controlling access (both of the individual terminals, via links 16a–16n, and the NCT via link 16r) to the limited satellite resource on a demand assignment basis. The demand-assigned multiple access (DAMA) protocol uses (FIG. 2) multiple FDMA channels (within the same satellite transponder) with a single channel 18 for reservation, control and data transmission and a number of separate channels 20a, 20b, 20c, . . . for voice transmissions. Channel time is divided into fixed intervals called frames. Each frame is further divided into four segments: a forward orderwire (FOW) segment 18a; a ranging segment 18b; a return orderwire (ROW) segment 18c; and a data transmission segment 18d. Each of these four segments is divided into a plurality of slots 20. Each time slot 20 accommodates a single burst of information from a single transmit terminal 14. Data transmission occurs in each of the time-sequential flames on channel 18; the M-th frame includes portions 18a–18c for channel reservation purposes and a portion 18d for data communications transmission. The portable terminals will operate in a half duplex mode with data communications provided at rates of between 75 bps and 2.4 kbps and voice communications at a data rate of 2.4 kbps. The network control equipment would be implemented as a rack mounted applique which would be installed in an available fixed-site terminal 12 of adequate size.

The slots 20 of the ranging segment 18c are used by each PT 14 during initial network entry to correct for the relative difference in propagation delay between the hub 12 and the satellite 11, and between the PT 14 and the satellite. Since the PT cannot "hear" its own ranging signal directly, the hub 11 is used to aid in the ranging process. After acquiring the FOW and frame synchronization in the downlink, the PT attempts to transmit its ranging signal such that it arrives at the hub terminal midway through a randomly-chosen slot 20 of the ranging segment 18c. This transmit time is selected based on a predetermined estimate of range to the satellite. The hub terminal, which has performed a self-loop ranging procedure, compares the actual time of arrival of the PT ranging signal to the true midpoint of the ranging slot. It then relays this value to the PT which adjusts its transmit time. The terminal is now frame synchronized in both the downlink and uplink. A similar aiding process is envisioned to resolve doppler and oscillator induced frequency offsets between the PT and the hub. Maintenance of time and frequency synchronization could be performed by periodically accessing a ranging slot or by measuring the offsets of routine PT transmissions such as the ROW signals. Other synchronization techniques which forego the need for ranging such as those which make use of satellite ephemeris data could also be implemented.

Channel resource control is effected through the use of the two orderwires. Terminals request channel access via the ROW and the hub responds to the requests via the FOW. The FOW contains DAMA control information such as channel assignments, system status, access restriction and service preemption. It also contains timing, frequency and cryptographic synchronization information which is needed for terminals to acquire the downlink. The ROW slots are used by portable terminals to request access, acknowledge messages and report status to the hub.

Many techniques for accessing a satellite network by multiple users are available and are well known to those skilled in the satellite communications arts. The choice of a particular channel access protocol is very dependent on the particular application; the low weight and compact size requirements of man-portable terminals present a unique set of design issues to be addressed. It is highly desirable to provide system characteristics and design goals which provide better channel access with a system supporting half-duplex data and voice communications, and a plurality of data transmission rates. Due to power constraints, portable terminals are not capable of communicating directly with each other and all communications have to be rebroadcast by a repeater. Therefore, any desired system will use a minimal number of channels in order to minimize hardware requirements; the system should dynamically assign resources to accommodate voice and data traffic to minimize the average waiting times of traffic and the blocking probability of voice calls.

BRIEF SUMMARY OF THE INVENTION

In accordance with the invention, a multiple channel demand assignment multiple access (DAMA) system is configured as a spoke-and-hub type network in which the hub receives requests from portable terminals, allocates channel resources, and broadcasts housekeeping messages. The system has a reservation protocol using at least three separate data channels to take advantage of the inherent lack of adequate radiated power at the small-aperture terminals 14: a net control terminal (NCT) outbound channel is tightly packed with data, without guard spaces, and it uses typically 98% of the allocated power; separate return channels for data and reservation use little satellite power, so that there is no need for extremely tight data packing. Hence adequate guard spaces are included in the reservation channel to overcome the total range of propagation delay uncertainty without requiring knowledge of the location of a particular PT. Typically, up to 10,000 reservation access units are available per hour for essentially contention-free operation. The data delays are reasonable and a high data throughput (about 1800 messages/hour) is provided. A short frame period (1.44 seconds long), with 4 access units per frame, limits data access request delays and voice call set up delays to a few seconds. In addition to the 3 data channels, up to 6 voice channels can be provided within a 500 kHz. total spectrum, thus allowing for voice traffic growth, which could result from an increased power allocation.

Minimum Shift Keying (MSK) and Convolutional Coding are used at all data rates over 150 bps to confine the spectrum of each channel while achieving coherent coding performance. At 75 bps and 150 bps BPSK is used as spectrum occupancy is traded for lower phase noise susceptibility. To aid in developing a phase reference and remove frequency offsets, a CW preamble is sent followed by a Start-of-Message (SOM) word for bit timing, slot timing and frame timing acquisition. Carrier phase and timing are acquired at the beginning of each transmission or frame by FFT processing techniques, so that loss of synchronization is not a problem.

In a specific embodiment, a Battery Power Saver Feature allows shutting down of all power-hungry modules in the PT for all but the sync preamble and the forward orderwire (FOW) periods, which occupy only 12.5% of any frame. If the address of a particular PT is not contained in the FOW, then that PT is not expected to receive or transmit anything and it can be automatically powered down. The protocol architecture and the sync preamble and processing techniques can accommodate ±16046 Hz in frequency offsets and 90 milliseconds in time errors, while synchronizing on the first preamble to appear. The allowable frequency and timing error values are sufficiently large so that both the NCT and the PT may be located anywhere within view of the satellite without the need for data aids, such as ranging or knowledge of the terminals' position. The CW part of the preamble is also used for an accurate CW Link Quality Analysis (LQA). The PT LQA forms the basis for outbound power and data rate selection, while the NCT LQA controls the inbound data rate.

For voice activities, our demand assignment multiple access (DAMA) protocol simultaneously supports a minimum of three voice channels and 1000 messages per hour within the permitted data delay time of 23 sec. For data, our 1.44 sec frame structure allows 10,000 accesses per hour with data delays ranging from 11 sec (500 messages/hr, with a multibeam antenna MBA configuration) down to 5.5 sec (700 messages/hr with a gimballed dish antenna GDA configuration). Centralized control of the system parameters is provided at the Network Control Terminal (NCT), so as to result in the greatest efficiency and, hence, short data/voice access delays. The NCT outbound power, data rate, message transmission time, carrier frequency, number of voice channels, and the PT carrier frequency offset compensation, message starting time, data rate, and transmission duration are all controlled by the NCT. The PT measures the C/N performance and reports channel quality to the NCT so that the NCT can subsequently configure the PT transmission parameters and, based on its own receiver measurements, inform the PT of the outbound and inbound channel parameters that the PT shall use, to relieve the PT from making channel configuration decisions. Thus, the only network operations PT perform are requests to initiate voice or data traffic by control of the field operator. By providing centralized control at the NCT and assigning 98% of the allocated satellite power to NCT outbound channels nearly continuous use is made of these channels (i.e., the peak-to-average power utilization is very close to 1.0).

The foregoing advantages will now become apparent to those skilled in the art upon reading the following detailed description of a presently preferred embodiment, when considered in conjunction with the associated drawing figures.

DETAILED DESCRIPTION OF PRESENTLY PREFERRED EMBODIMENT

As shown in FIG. 1, the NCT 12 and at least one of generic small antenna aperture terminals SATs, herein also referred to as PTs 14a–14n (although any particular one of the SATs need not be portable, or even transportable), communicate with each other via the translating transponder of satellite 11. At the satellite, my system makes a major distinction between inbound traffic (from PT to NCT) and outbound traffic (from NCT back to PT), even if both transmissions use identical data rates. For identical satellite antenna gains and identical values of $C/N_o$ at each receiver, the inbound (PT to NCT) link may require on the order of 20 dB less satellite power than the outbound link, due to the approximately ten-to-one ratio of the PT and NCT antenna diameters and the consequent 100:1 ratio (20 dB) in effective area.

Figure 3:
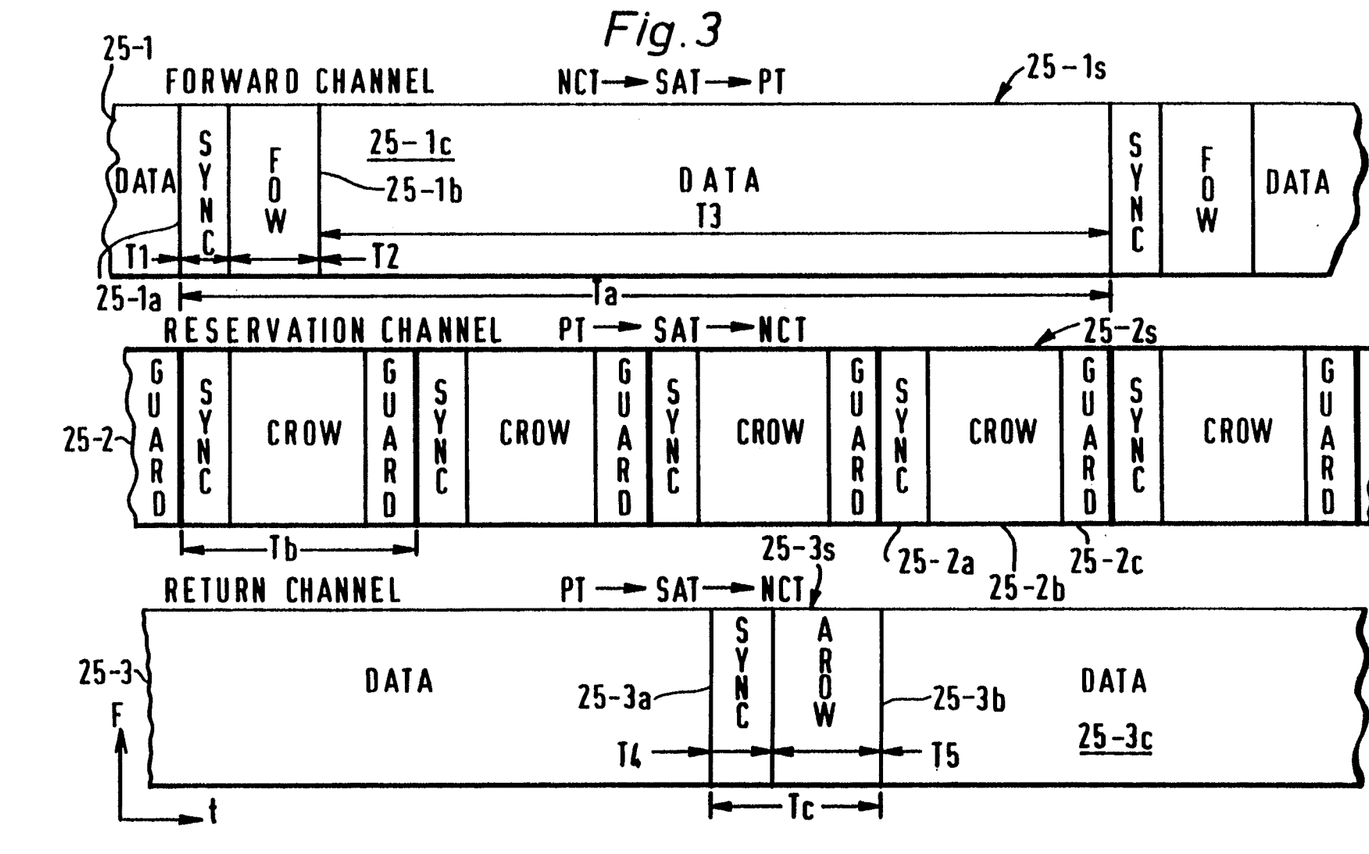
FIG. 3 is a frequency-time graph of the three data-reservation channels of a system in accordance with the present invention.

The channel access protocol uses frequency division multiple access (FDMA) of signals to and from each of the half-duplex PTs 14. In accordance with my invention, three separate data channels, each on a different frequency, are used to effect reservation and basic data transfer. As seen in FIG. 3, the three data channels 25 required for any network are: a forward channel 25-1 from NCT (outbound); a reservation channel 25-2 from PT (inbound); and a return channel 25-3 from PT (inbound). Each segment 25-1s on forward channel 25-1 includes a synchronization (SYNC) portion 25-1a of duration T1 (say, 45 mSec. or 1 slot time), a forward orderwire (FOW) portion 25-1b of duration T2 (say, 3 slots or 135 mSec., and sufficient for transmission of 324 bits at 2400 bps), and a data portion 25-1c of duration T3 (say, 28 slots or 1.26 sec., and sufficient for the transmission of between 378 characters at 2400 bps and 3024 characters at 19.2 Kbps); the entire segment thus has a duration Ta of 1.44 sec or 32 slots. Each segment 25-2s of the reservation channel includes a sync portion 25-2a, a contention-return-orderwire CROW portion 25-2b and a guard space portion 25-2c; the segment has a duration Tb of 8 slots, or 360 mSec. Each segment 25-3s of the return channel 25-3 includes a sync portion 25-3a of duration T4 (say, 2 slots or 90 Msec., sufficient for transmission of 108 bits at a speed of 2400 bps), an assigned return orderwire (AROW) portion 25-3b of duration T5 (say 4 slots or 180 Msec., for transmission of 216 bits at 2400 bps), and a duration Tc of 6 slots or 270 mSec.; if desired, a data portion 25-3c (with a maximum data transmission rate of 19.2 Kbps) can follow each AROW portion.

The forward and reservation channels 25-1 and 25-2 use a frame structure so that orderwires 25-1b and 25-2b occur with a predictable periodicity. The at least one return channel 25-3 uses an unframed data format. NCT 12 uses FOW portion 25-1b to precisely specify the start of the transmission time of each active SAT 14. An entire message, preceded by its sync portion, will be transferred in one block without gaps or interruptions. This results in the most efficient return link utilization.

Integrated voice/data operation is an important function of this system, to provide two-way voice communication between SATs 14. I presently prefer that digitized voice transmissions use the LPC-10 algorithm at a 2400 bps rate, with a 54-bit frame length, which translates to 22.5 mSec. or 0.5 slot length. Additional multiplexing benefits arise when the data slots and data flames are multiples of the 22.5 mSec. LPC-10 frame. Terminals initiating voice traffic will use the two dedicated channels 25-1 and 25-2 of the data network 25 for call setup and will then switch to a dedicated voice channel (not shown in FIG. 3, see FIG. 4). The voice terminal must, however, periodically listen for NCT-originated preemption messages. An integrated voice/data operation can be achieved if the NCT transmits voice channels and a 2400 bps FOW in synchronism.

Depending on the look angle of a SAT to the horizon, the one-way satellite delay can vary from 119.4 to 139.6 mSec. The worst case total propagation delay is 558.4 mSec. The NCT-to-satellite delay is "fixed" and known for a particular transmission. However, the roundtrip satellite-to-PT delay can vary up to 40.5 msec. A slot length equal to two voice frame lengths (45 Msec.) exceeds this propagation delay uncertainty. To avoid ambiguities, data and voice frames will be synchronous, with the aforementioned minimum data slot duration of 45 Msec.

A short frame period has been selected to minimize throughput delays and response time to priority access requests. The sync structure, which occupies only 3.1% of the frame 25-1s, consists of a 45 data-bit duration CW carrier signal and a 63 data-bit duration Start-of-Message (SOM) pseudorandom codeword. The sync SOM and the FOW may be transmitted at 2400 bps, although a 1200 bps configuration can be optional for low power satellite transponders and a 600 bps version is used with certain other transponders. The 1.26 second data period can be used with any data rate up to and including 19.2 Kbps. In fact, several different data rates can be used to communicate efficiently with different SATs during each frame. For example, one message at 19.2 Kbps may end in the middle of the frame and the next message at 2400 bps would start immediately to avoid loss of valuable frame time. The FOW defines source and destination identification, as well as data rate and start time for each message. The 324-bit FOW controls every action in the protocol as discussed below.

The return channel 25-3 (from the SATs) does not use the 1.44 second frame structure of forward channel 25-1. Instead, when commanded by the FOW, a PT sends a sync. transmission 25-3a (here, of 90 mSec.), followed by an AROW portion 25-3b at 1200 bps and/or data at a maximum rate of 19.2 Kbps. A single data rate is used for each SAT data transmission. The next return message again starts with sync followed by AROW and/or data from another PT. The FOW specifies the starting time and data rate. The reservation channel 25-2 divides the 32-slot frame 25-2s into four eight-slot units. The 90 mSec. guard space is more than adequate to handle all satellite path delay uncertainties. Therefore, unlike the aforementioned Goldberg et al. system, there is no need for a PT to perform a ranging function just to respond with a precisely known delay. The NCT measures path delay time from the NCT to the PTs and back to the NCT, to allow the NCT to command the return message starting time. CROW transmissions may only be initiated when enabled by the FOW. This allows sharing the reservation channel equipment at the NCT between CROW reception and periodic monitoring of the FOW for ranging and Doppler measurements and corrections.

Figure 4:
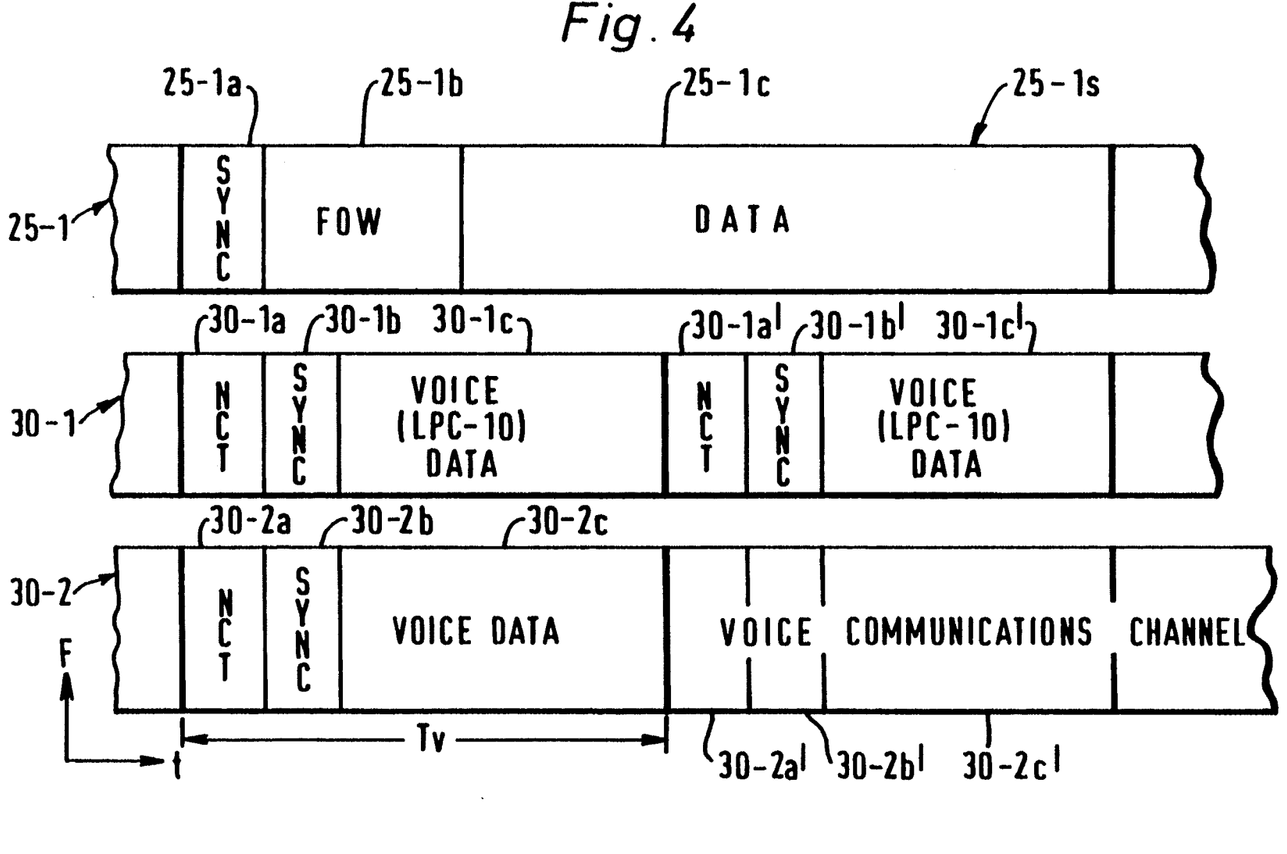
FIG. 4 is a frequency-time graph of the three data-reservation channel block and of several voice channels in a system in accordance with the present invention.

The voice channels operate in a half-duplex mode at each SAT, linking a talker and a listener via the NCT and two satellite hops. The NCT, as a full-duplex node, demodulates, performs channel error correction, synchronizes, and remodulates the voice traffic as part of its relay function. The NCT is required to provide at least 15 seconds of preemption notice and 30 seconds warning of time-out call termination. This presents a problem for the talker SAT, which must periodically listen to the NCT for voice channel messages. The listener has a similar problem if he must leave the voice channel and listen to the forward data channel with a control key rather than with the traffic key. Each voice user must look for messages sent by the NCT, and the NCT must monitor the channel for "on-hook" messages. The listener can only convey an "on-hook" message to the NCT via the CROW message to allow reassignment of the channel. My system solves these problems by using the NCT as the focal point for all voice control messages. The NCT, in a manner transparent to the user, inserts the appropriate control message into the voice channel as the information is transferred from an inbound voice channel to an outbound voice channel. In order to minimize voice distortion, the voice signals will not be interrupted to send the supervisory data. Instead, data compression will be used, by adding a data slot and a sync. slot every 720 Msec. for NCT control messages; NCT 12 can thus advise the talker and listener terminals as often as every 720 Msec. that preemption or timeout termination is imminent. Since four data slots out of every thirty-six slots will be devoted to such control, the voice signals must be compressed into thirty-two shorter slots by raising the instantaneous voice data rate to 2700 bps. The voice control messages occupy $4/36 = 11.1\%$ of the time, resulting in a voice energy loss of about 0.51 dB. The data compression adds slightly less than 80 mSec. delay to the first bit after the control message transmission. Subsequent bits are delayed by lesser amounts until the next message burst occurs. FIG. 4 illustrates the timing relationships at the NCT between the forward data channel 25-1 and two forward voice channels 30-1 and 30-2; any desired number of forward voice channels 30 may be provided, up to a practical limit imposed by system frequency bandwidth. Control messages, including any pre-emption advisory, will be injected at the same time into a leading NCT portion 30-xa, where x is the channel number, of all voice channels requiring NCT advisories. The NCT portion will be followed by a sync. portion 30-xb and a voice data (e.g. LPC-10) portion 30-xc; advantageously, the voice communications channel frame time interval Tv will be one-half of the synchronous forward channel frame interval Ta (e.g. duration Tv will be 0.720 seconds for Ta=1.44 sec., so that a voice data burst of 1728 bits is used in every portion 30-xc). The sync. portion is thus inserted by the talker terminal, so that the NCT can re-synchronize on the received signal, without loss of data bits, following the NCT's own transmission.

Figure 5:
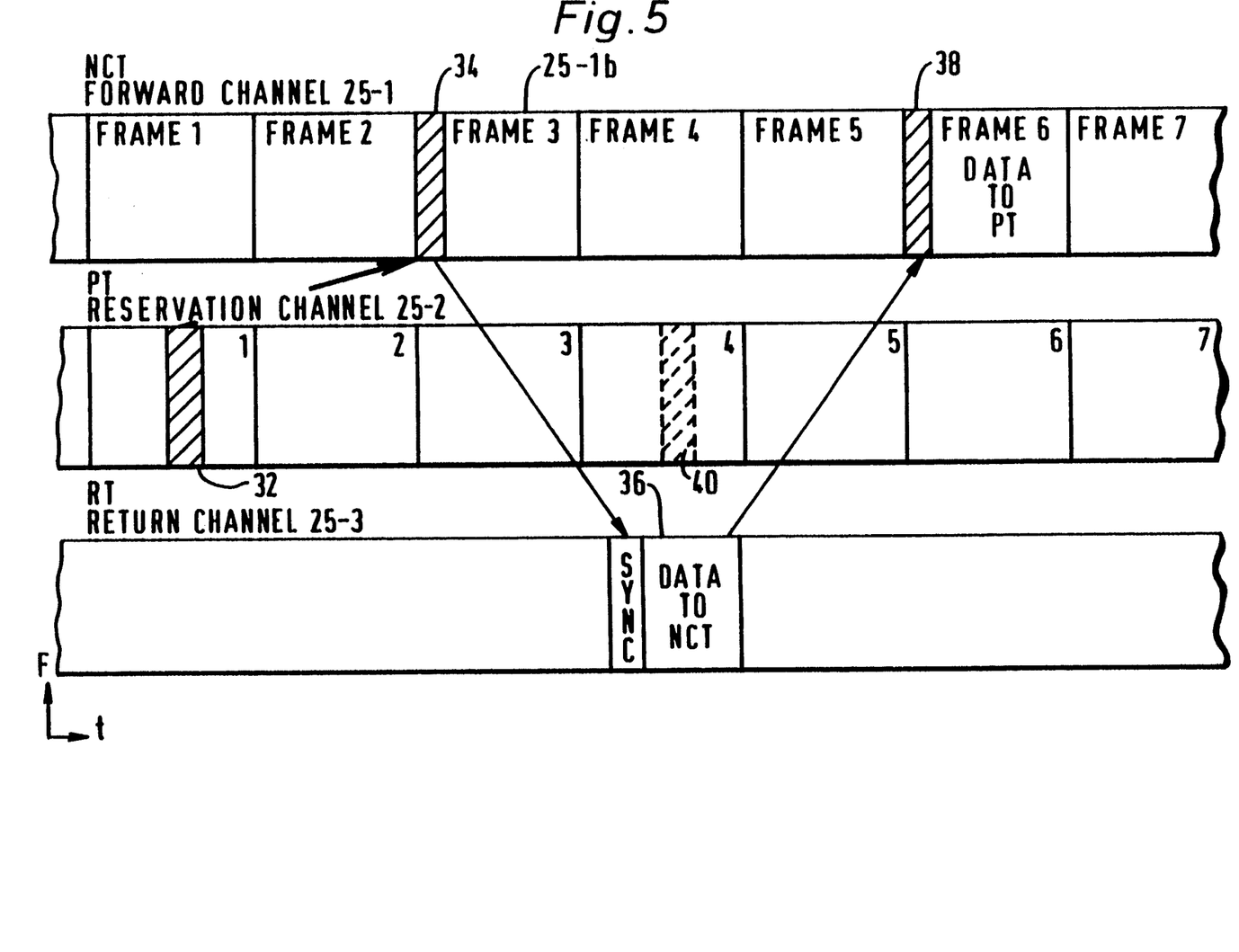
FIG. 5 is a frequency-time graph of the three data channels during establishment of a connection between PT and hub NCT.

Referring now to FIG. 5, several system protocol functions will be described in some detail. Since data rates on the inbound link (on channel 25-2 from a source PT 14$i$, where $1 \leq i \leq n$, to the NCT) rarely match data rates on the outbound link (on channel 25-1 from the NCT to the destination PTj, where j is not equal to i), all data traffic will be buffered at NCT 12. The NCT will not retransmit data in the same frame in which it arrived; a delay of one or more data flames will be the rule. The FOW will announce the frame and location, using relative timing up to 16 flames. The N-th frame forward order wire thus defines data rates and destination for data in frame (N+1) to allow time for processing of orderwire data. FOW commands for return channel traffic data rates and starting slots also precede the requested activity by at least one frame to allow the transmitting PT 14$i$ to process the request and switch from receive to transmit. The data portion 25-1c of each forward channel frame can accommodate up to two message bursts of different length and data rates.

A SAT 14$i$ wishing to transmit must first tune to forward channel 25-1, acquire sync. from portion 25-1a of a frame and then send a request 32 in some frame (e.g. frame 1) on channel 25-2. The NCT response 34 appears in some later frame (e.g. frame 3), during which the PT will acquire and demodulate the FOW data in portion 25-1b. This data acknowledges receipt of the request and assigns a future frame and slot, while commanding correction of the transmit carrier frequency for receive frequency errors (Doppler, etc.). The transmitting SATi will delay start of transmission 36 by a known interval after it receives the forward link sync. in portion 25-1a. The guard time (90 mSec.) of portion 25-2c accommodates all PT locations. The NCT receives the CROW message portion 25-2b and notes its time of arrival (range delay); the NCT periodically measures its own range delay. It can thus compute the delay of a given PT, which delay is used by NCT 12 to refine the transmit slot assignment for that PT. The NCT usually acknowledges reception of the CROW in the next FOW portion 25-1a and may also authorize transmission of AROW or data in the return channel starting with a specific slot number 36. If, however, two different PTs attempt to send requests in the same CROW portion 25-2b, the NCT will detect the collision and will not send an acknowledgment. A PT sending a request and not receiving an acknowledgment within several flames will assume that the request of that PT was not heard and will then send another CROW 40 in a randomly selected reservation time unit. A PT receiving an acknowledgment 34 but no transmission assignment continues to listen for another timeout interval; either the NCT has a backlog of higher priority data to send or the PT is about to receive a message.

Data intended for another SATj will be transmitted in channel 25-3 to the NCT in one frame (e.g. frame 25-1s) and retransmitted by the NCT in a later frame. Various data transfer conditions can be used: flames can be of equal data rates; one frame can have a data rate in excess of the equal data rate of other flames; or the several flames can all be at different data rates. An AROW can be used without data, for link quality analysis or other communication between a SAT and the NCT.

In one operational aspect, the FOW uses 3 data slots (or 324 bits) to control a multiplicity of messages (up to 5000 messages per hour) on each of the forward data channel 25-1 and the return data channel 25-3. Up to 10,000 messages per hour can also be sent to acknowledge net entry, data message reception, end-to-end message transfer, exchange link quality analysis (LQA) data, set up voice calls, and other information, as desired. All outbound data and voice assignments include a selected number (e.g. y=10) source and destination address bits (covering $2^y=1024$ users, including groups). The outbound channel control messages of z (e.g. z=40) bits can include: source ID (say, 10 bits), destination ID (another 10 bits), priority number (say, 3 bits), frame number (e.g 4 bits), start time information (5 bits ), data rate (4 bits), and a sequence number (4 bits) which identifies individual messages from a particular terminal 14$i$. All inbound channel control, voice channel control, or status messages are some preselected length (say, 30 bits long). For example, a voice assignment message may include: source ID (10 bits), destination ID (10 bits), priority number (3 bits), time limit (4 bits), and voice channel assignment (3 bits). The eight messages (two of 40 bits each and six of 30 bits each) plus a (24 bit) BCH error detection code word use almost all of the segment bits (e.g. use 284 of 324 bits), leaving several final bits (e.g. 40 more bits) for network status (frame ID, control bits, etc.), coder flush, and spares.

The AROW and CROW portions contain similar information; the difference is that the AROW is commanded by the FOW (such as for a roll call), while the CROW originates at the PT. The CROW may include source and destination IDs, priority, voice/data access request, message lengths or voice duration, link quality parameters (C/N, frequency offset, etc.) terminal status, acknowledgment of sequence number (n) message, etc.; a (24 bit BCH) error detection code word may also be included. There are enough bits available to provide for short messages from the PT to the NCT operator.

For voice communications, a voice preemption message can be multiplexed into each outbound voice channel, and may include a small number of commands and a frequency error indication of the talking PT to prevent drifting from channel center frequency.

For data messages, it may be assumed that each data message has a random and separate inbound and outbound data rate. Since retransmitting inbound data messages requires only a small amount of satellite power, there will probably be a single distribution of inbound data rates, while the distribution of outbound data rates depends both on the percentage of satellite power available and on the number of monitors. If it is assumed that there are two monitors for each data transmission, and that the monitors are chosen randomly, then to accommodate both the primary destinations and the monitors, an outbound data message should be transmitted at the highest rate usable by the least capable of the three terminals meant to receive it. The mix of downlink data rates may be skewed, so that the probability of occurrence of a given data rate is redefined to be the likelihood that it would be the lowest maximum rate in a randomly chosen trio of terminals. The net effect is to lower transmit data rates. Where the mix of outbound data rates is unskewed, the results can be interpreted as either the performance of a system without monitors or the performance of a system which requires that links to monitors be at least as good as those for the primary destination. One of the key reasons for the high throughput and low average delay is the rather short frame period; newly arrived messages do not waste a lot of time in waiting for retransmission. A short frame will show even greater advantages when priority is included, as high priority requests will not encounter much delay before they are satisfied, and will thus pass quickly through the system.

The system has been designed to have an $E_b/N_o \leq 6$ dB at a BER of $10^{-5}$ for all data rates $\geq 300$ bps. Use of coded coherent BPSK may be required (e.g. rate $\frac{1}{2}$ convolutional coding, with a constraint length K=7). For coherent BPSK/QPSK at a BER=$10^{-5}$, the theoretical $E_b/N_o$ ratio is equal to 3.8 dB for coding with infinite quantization. At the other extreme of one bit quantization (hard decision), the $E_b/N_o$ ratio is 6.8 dB. Soft decision Viterbi decoder LSI chips are available (from Qualcomm, Inc. for processing 3 bit magnitudes for $E_b/N_o$=4.3 dB, and from Stanford Tele-Communications for processing 4 bit magnitudes for $E_b/N_o$=4.1 dB). With the 4 bit quantization unit, the amount allowable for implementation losses, link overhead and margin in 6.0 dB−4.1 dB=1.9 dB. All data and voice transmissions will use a standardized GMF rate $\frac{1}{2}$ convolutional code, K=7, with soft decision Viterbi decoding performed at each receiver. However, a coded channel has a steeper BER curve and is therefore more sensitive to phase noise. As a result of the coding, the theoretical $E_b/N_o$ at a BER=$10^{-5}$ will be 3.8 dB for BPSK. However, the code symbols for rate $\frac{1}{2}$ coding will then only have an $E_{cb}/N_o$=0.8 dB. Jacobs and Heller (1971) have studied the effects of phase noise on BPSK and QPSK with rate $\frac{1}{2}$, K=7 convolutional coding and 3-bit soft decision Viterbi decoding, quantifying the degradation of BER versus $E_b/N_o$ as a function of the loop filter S/N=$\alpha$, and concluding that BPSK requires approximately $\alpha \geq 16$ dB and QPSK requires $\alpha \geq 25$ dB. Because of problems with narrow loop filters, QPSK should therefore not be used for low data rate coded communications in this system.

The modulation and coding design for the PTs uses Minimum Shift Keying (MSK) and coherent demodulation for all data rates of 300 bps and up. MSK transmissions are implemented on a per bit basis with continuous phase changes to ±90°. Each bit decision admits only two alternatives: a +90° or a −90° phase shift. MSK was selected because its $E_b/N_o$ efficiency is the same as coherent BPSK; it does not introduce envelope modulation and, therefore, does not require linear amplification; its spectral containment allows plural PTs to be located in 10 KHz steps within a 500 KHz band.

The system time and frequency synchronization scheme provides for rapid synchronization with minimal PT signal duration and protects against loss of sync throughout the transmission. Sync is acquired at the beginning of each forward (outbound) frame of channel 25-1 and each return (inbound) transmission of channel 25-2, and tracked during the remainder of that frame or transmission. A synchronization preamble prefaces each forward and return data transmission. Each sync preamble on forward (outbound) transmissions is sent in one data slot out of a 32-slot data frame. The sync preamble uses 3.125% of the data frame and thus reduces the potential data transmission energy by only 0.14 dB. The sync preamble duration is equivalent to 108 data bits; 63 are used for a start-of-message (SOM) codeword and the remaining 45-bit period is used for CW transmission. The data at 2400 information bps is transmitted at a 4800 channel bps (forward error correction at rate $\frac{1}{2}$). In order to use the same keying rate in the preamble as is used with transmit data, the 63-bit period preamble is sent as 126 chips. Relative to one channel bit, the correlation performance is equivalent to 21 dB (126 chips) without additional processing load. The processing gain of the CW segment based on a channel bit is 19.5 dB.

The protocol uses dedicated rather than time-shared forward, return and reservation channels, so that there is no need for the PTs to know their own path delay. The NCT will fully pack forward transmissions and control the start of return transmissions to avoid large gaps between messages. Only the reservation channel needs a guard space to accommodate the 40.5 mSec. delay uncertainty; the 45 mSec. data time slots are sufficiently large for this purpose. Sync performance in acquiring the first preamble is sufficient to essentially guarantee detection with negligible false alarm probability. The maximum time and frequency acquisition time, even for initial network entry, will generally not exceed 1.44 seconds. Such short acquisition times make it unnecessary to use any data base parameters to shorten acquisition time. Although time corrections are superfluous within this protocol, frequency corrections serve a useful purpose. We must distinguish between absolute frequency errors and relative frequency errors. Absolute frequency errors, referenced against an outside standard, define the location of the composite PTS spectrum within the satellite band. Absolute errors also define the frequency acquisition range of each PT. Relative frequency errors, referenced against the NCT, define the spectral spacing of signals, and also define the frequency acquisition range at the NCT for its own signal and frequency-corrected PT signals. The NCT corrects for its own frequency errors, as well as for the roundtrip path errors, initially and at periodic intervals. The PTs correct their transmit frequency in response to NCT commands.

The unique synchronization preamble, including a CW burst and a start-of-message word at the beginning of each transmission from a terminal, serves to provide for precise frequency offset and time delay corrections and carrier-to-noise ratio measurement. Every data exchange, including voice requests between a PT and the NCT, includes an update of a bi-directional link quality analysis (LQA) implementation: during the process of requesting permission to send voice or data, each PT performs a link quality analysis (LQA) and reports the results to the NCT; the NCT broadcasts the outbound FOW to enable all PTs to request network services over the contention channel; the FOW sync. preamble begins with a CW tone which allows the receiving terminal to determine the $C/N_o$ and frequency offset; and the receiving terminal initially performs a 256-point fast Fourier transform (FFT) on the received tone to determine signal presence and frequency offset. After the terminal determines the large frequency offset, it performs fine resolution discrete Fourier transform (DFT) correlations between the two greatest adjacent FFT-detected tones and resolves the frequency offset to within several Hz. The fine frequency resolution routine provides more accuracy to compensate for the detected frequency offset and centers the computation of a subsequent FFT routine to within $\frac{1}{8}$ bin so that the CW tone does not straddle two bins. This pre-centering allows the FFT to measure the C/N with 95% accuracy in a 13 mSec. measurement period; a non-centered computation could report a C/N that was only 40% of the correct value. The receive terminal then performs a spectrally centered FFT on the CW tone to compare the narrowband energy of the CW signal in one FFT bin to the total spectral energy within the channel bandwidth summed across all of the other bins in the modulation bandwidth. The result is a measure of the carrier-to-noise density ratio of the received signal.

After the PT detects the time offset of the start-of-message segment and demodulates the orderwire data, it can request a network assignment. Within each request are the two measured LQA parameters: the frequency offset determined from the first FFT and DFT routines, and the $C/N_o$ value measured in the second FFT. The NCT maintains these measurements for the duration of the message exchange. Because the LQA parameters are an integral part of each network transmission, power and data rate control impose no protocol delay and little link overhead.

Prior to establishment of full network operations, the NCT initialized the PT network by entering a maximum output power level allocated by the satellite manager. The NCT transmission includes a test signal on the forward (outbound) channel: the normal FOW format is used so that frequency offset, time delay, and $C/N_o$ can be measured. The full-duplex NCT transmits and monitors the satellite transponder to determine the time and frequency compensation needed to offset the effects of the satellite position, relative motion, and frequency reference errors accumulated between the ground and space radio equipment. To verify the NCT power level selection, the satellite system manager calibrates this level by monitoring the signal strength of the NCT-generated test signal and directs the NCA to adjust the NCT output as required. After NCT output power is calibrated, the NCA autonomously distributes the allocated bandwidth and power among network users and itself to insure connectivity at the best efficiency. The NCT periodically tests itself to re-adjust to changing link conditions and to insure that the PT network does not exceed its satellite power allocation. Based on the satellite allocation and channel attenuation, the NCT distributes transmit power and bandwidth to PT channels to meet the changing traffic loads. The EIRP of the signal from the NCT will be much stronger than a signal transmitted from a PT since the NCT compensates for the small antennas at the PTs. The transmit power of the NCT outbound channels therefore dominate the PTS allocated satellite power budget. As traffic loading changes, the NCT redistributes its output power in the fixed data rate channels (voice and forward orderwire outbound data) and changes the bandwidth in variable data rate channels (outbound data traffic). The NCT will use LQA information to determine the data rate for future message traffic to the PT. If the PT is to operate in the voice mode, the data rate remains fixed at 2400 bps; the NCT can modify its transmit power instead of data rate to improve link performance.

There has just been described a satellite communications system in which three data channels are used to assure that the allocated satellite power is almost entirely used by the NCT for data and voice transmission. One inbound and one outbound data channel are used, along with one inbound reservation channel. All frequency, timing, and power control decisions are made at the NCT. While many details have been provided herein, those skilled in the art will now realize that many modifications and variations can be made to my invention without departing from the spirit and intent thereof. Accordingly, it is my intent to be limited only by the scope of the appending claims and not by the specific details and instrumentalities set forth herein.

What I claim is:

1. A satellite communications system, comprising:
   a communications satellite having at least one translator;
   at least one small-aperture terminal (SAT) capable of sending data transmissions to and receiving data transmissions from said communications satellite; and
   a hub network control terminal (NCT) capable of sending data transmissions to and receiving data transmissions from said communications satellite, and adapted to configure transmissions to and from the satellite into at least three data channels, with each of the three data channels being in a separate frequency band from a frequency band occupied by either other channel and with substantially all of the satellite transmission power allocated to the at least one small aperture terminal, and said three data channels comprising a first channel being used by the hub network control terminal to provide for initial contact to any of the at least one small aperture terminals desiring to communicate, a second channel being used by one desirous small aperture terminal to gain the attention of the hub network control terminal, and a third channel being used by the desirous small aperture terminal gaining the attention of the hub network control terminal to thereafter transmit information via the hub network control terminal.

2. The system of claim 1, wherein the hub network control terminal utilizes the three data channels to allow a plurality of the small aperture terminals to communicate in time-sequential manner through the satellite and the hub network control terminal.

3. The system of claim 2, wherein the hub network control terminal implements a demand-assignment-multiple-access (DAMA) protocol for facilitating said plurality of the small aperture terminals to communicate during each of a multiplicity of sequential time frames.

4. The system of claim 1, wherein the three channels are configured, at the hub network control terminal, as one inbound data channel, one outbound data channel, and one inbound reservation channel.

5. The system of claim 4, wherein all system frequency, timing, and power control decisions are made at the hub network control terminal.

6. The system of claim 1, wherein at least one voice channel is also provided, with a control data message being insertable in a non-interferring manner within a stream of data on each voice channel.

7. A satellite communications system, comprising:

a communications satellite having at least one translator;

at least one small-aperture terminal (SAT) capable of sending data transmissions to and receiving data transmissions from said communications satellite; and a hub network control terminal (NCT) capable of sending data transmissions to and receiving data transmissions from said communications satellite, and adapted to configure transmissions to and from the satellite into at least three data channels, with each of the three data channels arranged in a separate frequency band from a frequency band occupied by either other channel with a first channel being used by the NCT to provide for initial contact to any of the at least one small aperture terminals desiring to communicate, a second channel being used by one desirous small aperture terminal to gain the attention of the hub network control terminal, and a third channel being used by the desirous small aperture terminal gaining the attention of the hub network control terminal to thereafter transmit information via the hub network control terminal, with the three data channels allowing a plurality of small aperture terminals to communicate in time-sequential manner through the satellite and the hub network control terminal, with the hub network control terminal both causing each of the three data channels to be substantially continuously present at the satellite and implementing a demand-assignment-multiple-access (DAMA) protocol for facilitating said plurality of the small aperture terminals to communicate during each of a multiplicity of sequential time frames.

8. The system of claim 7, wherein substantially all of the satellite transmission power allocated to the three channels is used for transmission to the at least one small aperture terminal.

9. The system of claim 7, wherein the three channels are configured, at the hub network control terminal, as one inbound data channel, one outbound data channel, and one inbound reservation channel.

10. The system of claim 9, wherein all system frequency, timing, and power control decisions are made at the hub network control terminal.

11. The system of claim 7, wherein at least one voice channel is also provided, with a control data message being insertable in non-interfering manner within a stream of data on each voice channel.

12. The system of claim 11, wherein the control data message is provided in at least one associated data slot, and the voice data in adjacent slots is transmitted at a commensurate higher rate.

13. A satellite communications system, comprising:

a communications satellite having at least one translator;

at least one small-aperture terminal (SAT) capable of sending data transmissions to and receiving data transmissions from said communications satellite; and a hub network control terminal (NCT) capable of sending data transmissions to and receiving data transmissions from said communications satellite, and adapted to configure transmissions to and from the satellite into at least three data channels, said three data channels comprising a first channel being used by the hub network control terminal to provide for initial contact to any of the at least one small aperture terminals desiring to communicate, a second channel being used by one desirous small aperture terminal to gain the attention of the hub network control terminal, and a third channel being used by the desirous small aperture terminal gaining the attention of the hub network control terminal to thereafter transmit information via the hub network control terminal; and means for providing at least one voice channel, with a control data message being insertable in a non-interfering manner within a stream of data on each voice channel, with the control data message provided in at least one associated data slot, and with the voice data in adjacent slots transmitted at a commensurate higher rate.

14. The system of claim 13, wherein the hub network control terminal utilizes the three data channels to allow a plurality of the small aperture terminals to communicate in time-sequential manner through the satellite and the hub network control terminal.

15. The system of claim 14, wherein the NCT implements a demand-assignment-multiple-access (DAMA) protocol for facilitating said plurality of the small aperture terminals to communicate during each of a multiplicity of sequential time frames.

16. The system of claim 15, wherein the hub network control terminal causes each of the three data channels to be substantially continuously present at the satellite.

17. The system of claim 13, wherein the three channels are configured, at the NCT, as one inbound data channel, one outbound data channel, and one inbound reservation channel.

18. The system of claim 17, wherein all system frequency, timing, and power control decisions are made at the NCT.

19. The system of claim 13, wherein the hub network control terminal arranges each of the three data channels in a separate frequency band from a frequency band occupied by either other channel.

20. The system of claim 19, wherein substantially all of the satellite transmission power allocated to the three channels is used for transmission to the at least one small aperture terminal.

* * * * *